United States Patent Office 2,811,429
Patented Oct. 29, 1957

2,811,429

STABILIZATION OF MOTOR FUELS

Gerald R. Lappin and John W. Thompson, Kingsport, Tenn., assignors to Eastman Kodak Company, Rochester, N. Y., a corporation of New Jersey No Drawing. Application August 31, 1953, Serial No. 377,721

10 Claims. (Cl. 44—71)

This invention relates to the stabilization of motor fuels, particularly gasolines, which are subject to deterioration caused by the action of molecular oxygen, containing a catalytically active metal reagent normally effective to catalyze oxidation of said motor fuel.

Many gasolines are subject to rapid deterioration as a result of oxidation through contact with air. This oxidative deterioration is greatly accelerated by the catalytic effects of certain metals and their compounds. Cracked gasoline is particularly subject to metal catalyzed oxidation with resulting gum formation. Thus, a cracked Pennsylvania gasoline containing N-n-butyl-p-aminophenol as an oxidation inhibitor was found to develop only 3.8 mg. of A. S. T. M. gum per 100 cc. during eight months' storage while a sample of the same gasoline containing 1 mg. of copper per liter developed 12.0 mg. of A. S. T. M. gum per 100 cc. after one month of similar storage. Copper, cobalt, and manganese and their compounds are among the chief catalytically active metal reagents which catalyze oxidation of gasoline. However, lead, vanadium, iron and chromium and their compounds, for example, may also accelerate the rate of oxidation of motor fuels, such as gasoline.

In recent years compounds referred to as "oxidation inhibitors" or "antioxidants" have been used to help preserve organic substances, such as gasoline, subject to oxidative deterioration. These agents, which are mostly oxidizable organic compounds, retard the autocatalytic process. While the discovery of "antioxidants" has been of much help since they are themselves oxidized in the course of time, as a result of auto-oxidation, the beneficial effect obtained by their use in not permanent and they protect the organic substances only so long as they are not rendered inactive.

Catalytically active metal reagents accelerate the oxidation of the antioxidants used to stabilize organic substances subject to oxidative deterioration. Accordingly, these catalytically active metal reagents and the antioxidants are antagonistic in action and the normal inhibiting effect of the antioxidant is greatly reduced in the presence of a catalytically active metal reagent. It is, therefore, desirable to provide some method which deactivates the activity of the catalytically active metal reagent, thereby allowing the antioxidant to function at its fullest efficiency.

It is an object of our invention to retard the deterioration of motor fuels caused by the action of molecular oxygen and promoted by the presence of certain metal catalysts and their catalytically active compounds. Another object is to provide motor fuels of improved stability. Another object is to render antioxidants, which are relatively ineffective in the presence of metal catalysts and their catalytically active compounds, effective to inhibit the oxidation of motor fuels even in the presence of metal catalysts and their catalytically active compounds. A specific object is to retard the deterioration of gasoline caused by the action of molecular oxygen and promoted by the presence of certain metal catalysts and their catalytically active compounds. Another object of our invention is to provide an improved method of deactivating catalytically active metal reagents present in motor fuels such as gasoline.

We have discovered that amine salts of hydroxy aliphatic tricarboxylic acids and hydroxy aliphatic dicarboxylic acids deactivate catalytically active metal reagents in motor fuels such as gasoline. These amine salts of the aforesaid hydroxy aliphatic carboxylic acids can be employed to deactivate metals such as copper, cobalt, manganese, vanadium, chromium, lead and iron and their compounds in motor fuels, such as cracked gasoline, whereby the product obtained is of greatly improved stability. By employing the amine salts of the aforesaid hydroxy aliphatic carboxylic acids as metal deactivators, the economical use of gasoline antioxidants is facilitated since excessive quantities of antioxidants are required to properly stabilize gasoline containing catalytically active metal reagents.

The amine salts of hydroxy aliphatic tricarboxylic acids and hydroxy aliphatic dicarboxylic acids employed by us as deactivators have for the most part the formula:

wherein R represents an alkyl group, an alkenyl group, a cycloalkyl group, an aryl group or a substituted aryl group, R₁ represents a hydrogen atom, an alkyl group or a cycloalkyl group, R₂ represents a hydrogen atom or an alkyl group and X represents a hydroxy aliphatic tricarboxylic acid or a hydroxy aliphatic dicarboxylic acid.

From about 0.0001 to about 0.1% by weight of our deactivator compounds is ordinarily required to deactivate any catalytically active metal reagent that may be present in the motor fuel, depending on the concentration of the catalytically active metal reagent which exists in the motor fuel. Higher and lower concentrations of the deactivator can also be employed depending upon the particular circumstances involved.

The metal deactivators of our invention can be added alone or in admixture with other additives which are to be incorporated into the motor fuel being treated. Such other additives include antioxidants, dyes and antiknock compounds, for example. The deactivators of our invention can be added as such to the motor fuel but they are preferably added in the form of a concentrated solution in a solvent such as ethyl alcohol, isopropyl alcohol, benzene or other suitable organic solvent.

The metal deactivators of our invention possess an advantage over known deactivators such as N,N'-disalicylidene-1,2-propylenediamine in that they will deactivate metals other than copper, such as cobalt, iron and manganese, for example.

Preferably when the member R is an alkyl or alkenyl group it contains 8 or more, usually 8 to 18, carbon atoms while R₁ and R₂ are hydrogen or a lower carbon alkyl group. It is preferred that R, R₁ and R₂ be as stated because the salt compounds thus formed are more soluble in gasoline. However, the use of other amines also give effective deactivators having usable gasoline solubility.

Amines that can be used in preparing the deactivator compounds of our invention include, for example, methylamine, ethylamine, isopropylamine, n-propylamine, n-butylamine, isobutylamine, secondary butylamine, n-amylamine, secondary amylamine, n-hexylamine, secondary hexylamine, n-heptylamine, n-octylamine, n-nonylamine, n-decylamine, n-dodecylamine, n-octadecylamine, allylamine, crotylamine, oleylamine, cyclohexylamine, dicyclohexylamine, cyclobutylamine, dicyclobutylamine, din-amylamine, tri-n-amylamine, di-n-propylamine, diisopropylamine, di-n-butylamine, diisobutylamine, tri-n-butylamine, N,N-dimethyl-n-dodecylamine, linoleylamine, linolenylamine, aniline, o-, m-, and p-toluidine, Primene JM–R and Primene 81–R, both of which are mixtures of amines having the general structure

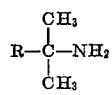

wherein R represents a branched chain of from fifteen to twenty-one carbon atoms for Primene JM–R and from nine to twelve carbon atoms for Primene 81–R, and which are manufactured by Rohm and Haas Company and described in their technical bulletin SP–33, dated December 1951, and entitled "Tertiary-Alkyl Primary Amines," and Armeen CD and Armeen SD, which are high molecular weight aliphatic amines manufactured by the Armour Chemical Division of the Armour and Company and described on page 3 of their technical bulletin entitled "The Chemistry of Fatty Amines," copyrighted in 1948.

Hydroxy aliphatic carboxylic acids that can be used in preparing the deactivator compounds of our invention include, for example, citric acid, tartaric acid, tartronic acid, malic acid and oxalacetic acid (enol form). Citric acid and tartaric acid are preferred because of their availability.

The deactivator compounds (amine salts of a hydroxy aliphatic tricarboxylic acid or a hydroxy aliphatic dicarboxylic acid) are prepared by mixing the amine and the hydroxy aliphatic carboxylic acid either in the presence or absence of an added solvent such as ethyl alcohol, isopropyl alcohol or benzene. Preferably the acid and amine are brought together in equimolecular proportion and unless otherwise noted the deactivators employed in the examples which follow were so prepared. An excess of amine may be employed if desired. In this case the excess of amine may serve as a mutual solvent.

n-Dodecylamine citrate, oleylamine citrate, n-octadecylamine citrate, di-n-amylamine citrate, tri-n-amylamine citrate, tri-n-butylamine citrate, N,N-dimethyl-n-dodecylamine citrate, methylamine citrate, ethylamine citrate, n-butylamine citrate, diisobutylamine citrate, n-hexylamine citrate, n-octylamine citrate, n-decylamine citrate, allylamine citrate, crotylamine citrate, cyclohexylamine citrate, dicyclohexylamine citrate, n-dodecylamine tartrate, oleylamine tartrate, n-octadecylamine tartrate, di-n-amylamine tartrate, tri-n-amylamine tartrate, tri-n-butylamine tartrate, N,N-dimethyl-n-dodecylamine tartrate, methylamine tartrate, ethylamine tartrate, n-butylamine tartrate, diisobutylamine tartrate, n-hexylamine tartrate, n-octylamine tartrate, n-decylamine tartrate, allylamine tartrate, crotylamine tartrate, cyclohexylamine tartrate, dicyclohexylamine tartrate, oleylamine tartronic acid, n-dodecylamine tartronic acid, n-octadecylamine tartronic acid, tri-n-amylamine tartronic acid, dicyclohexylamine tartronic acid, oleylamine malic acid, n-dodecylamine malic acid, n-octadecylamine malic acid, tri-n-amylamine malic acid and di-cyclohexylamine malic acid are illustrative of the deactivator compounds of our invention.

The efficiency of the deactivators of our invention in deactivating copper and other metals was demonstrated by oxygen bomb stability tests on cracked gasoline containing various combinations of antioxidants, catalytically active metal reagents and the subject deactivators. The copper was added as a benzene solution of cupric oleate, the cobalt as a toluene solution of cobaltous stearate and the manganese as a toluene solution of manganous oleate. The antioxidant used was N-n-butyl-p-aminophenol. The deactivators were added as benzene or benzene-alcohol solutions. The oxygen bomb stability test used to determine the induction periods of the various samples was that described in Industrial and Engineering Chemistry (Ind. Ed.), vol. 24, p. 1375 (1932).

EXAMPLE 1

A Pennsylvania cracked gasoline composed of thermal and catalytic stocks was employed which had an induction period of 65 minutes which was raised to 427 minutes upon addition of 0.0048 weight percent of N-n-butyl-p-aminophenol, which is a very effective gasoline antioxidant known in the art. Upon addition of 1.0 mg. of copper per liter to this inhibited fuel, the induction period was reduced to 120 minutes. However, the addition of 0.0015 weight percent of di-n-amylamine citrate to this inhibited copper-containing gasoline gave an induction period of 445 minutes, indicating complete restoration of the stability loss due to copper.

EXAMPLE 2

The same inhibited copper-containing gasoline described in Example 1 was treated with 0.0015 weight percent of tri-n-amylamine citrate. The induction period was raised from 120 minutes to 430 minutes.

EXAMPLE 3

The same inhibited copper-containing gasoline described in Example 1 was treated with 0.0015 weight percent of oleylamine citrate. The induction period was raised from 120 to 435 minutes.

EXAMPLE 4

The same inhibited copper-containing gasoline described in Example 1 was treated with 0.00125 weight percent of dicyclohexylamine citrate. The induction period was raised from 120 to 435 minutes.

EXAMPLE 5

The same inhibited copper-containing gasoline described in Example 1 was treated with 0.00125 weight percent of Primene 81–R citrate. The induction period was raised from 120 to 425 minutes.

EXAMPLE 6

The same inhibited copper-containing gasoline described in Example 1 was treated with 0.001 weight percent of Armeen SD citrate. The induction period was raised from 120 minutes to 420 minutes.

EXAMPLE 7

The same inhibited copper-containing gasoline described in Example 1 was treated with 0.001 weight percent of Armeen CD citrate. The induction period was raised from 120 to 430 minutes. The composition of Armeen CD is substantially as follows:

| | Percent |
|---|---|
| Dodecylamine | 57 |
| Tetradecylamine | 21 |
| Hexadecylamine | 10 |
| Octadecylamine | 2 |
| Octadecenylamine | 7 |
| Octadecadienylamine | 3 |

Percentages are expressed by weight.

EXAMPLE 8

This example illustrates that the deactivators of our invention will deactivate cobalt. The addition of 1.0 mg. per liter of cobalt to the inhibited gasoline of Example 1 reduced the induction period to 220 minutes. However, the addition of 0.001 weight percent of oleylamine citrate to the inhibited cobalt-containing gasoline raised the induction period to 465 minutes, indicating complete restoration of the stability loss due to cobalt.

EXAMPLE 9

The same cobalt-containing inhibited gasoline described in Example 8 was treated with 0.003 weight percent of Primene 81–R tartrate. The induction period was raised from 220 minutes to 475 minutes.

EXAMPLE 10

This example illustrates that the deactivators of our invention will deactivate manganese. The addition of 1.0 mg. per liter of manganese to the inhibited gasoline of Example 1 reduced the induction period to 340 minutes. However, the addition of 0.001 weight percent of oleylamine citrate to the inhibited manganese-containing gasoline increased the induction period to 470 minutes.

EXAMPLE 11

This example illustrates that the amine salts of tartaric acid are effective metal deactivators. The 427-minute induction period of the gasoline of Example 1 was reduced to 120 minutes by the addition of 1 mg. of copper per liter. However, the addition of 0.00125 weight percent of dodecylamine tartrate to this inhibited copper-containing gasoline raised the induction period to 420 minutes, indicating practically complete restoration of the stability loss due to copper.

The results obtained employing other deactivator compounds of our invention as metal deactivators in a cracked gasoline containing a catalytically active metal reagent are shown in Table 1.

*Table 1.—Effectiveness of amine salts of a hydroxy aliphatic tricarboxylic acid or a hydroxy aliphatic dicarboxylic acid as metal deactivators for gasoline*

[The gasoline used is that described in Example 1]

| Test No. | Antioxidant Conc., Wt. Percent (N-n-Butyl-p-aminophenol) | Metal Present, 1 Mg./Liter | Deactivator Compound | Deactivator conc., Wt. Percent | Induction Period, Min. (Oxygen Bomb Stab. Test) |
|---|---|---|---|---|---|
| 1 | None | None | None | None | 65 |
| 2 | 0.0048 | do | do | None | 427 |
| 3 | 0.0048 | Copper | do | None | 120 |
| 4 | 0.0048 | do | n-Dodecylamine citrate | 0.001 | 377 |
| 5 | 0.0048 | do | n-Octadecylamine citrate | 0.0015 | 405 |
| 6 | 0.0048 | do | Tri-n-butylamine citrate | 0.0015 | 440 |
| 7 | 0.0048 | do | N,N-Dimethyl-n-dodecylamine citrate | 0.0015 | 455 |
| 8 | 0.0048 | do | Primene JM-R citrate | 0.001 | 410 |
| 9 | 0.0048 | do | Primene 81-R citrate | 0.001 | 425 |
| 10 | 0.0048 | do | Primene 81-R tartrate | 0.001 | 430 |
| 11 | 0.0048 | do | Aniline citrate | 0.001 | 430 |
| 12 | 0.0048 | Cobalt | None | None | 220 |
| 13 | 0.0048 | do | Tri-n-amylamine citrate | 0.0010 | 475 |
| 14 | 0.0048 | do | Primene 81-R tartrate | 0.001 | 475 |
| 15 | 0.0048 | Manganese | None | None | 340 |
| 16 | 0.0048 | do | Tri-n-amylamine citrate | 0.0010 | 475 |
| 17 | 0.0048 | do | Primene 81-R tartrate | 0.001 | 490 |

In order that our invention may be clearly understood, the formulas for representative deactivator compounds are given hereinafter:

Oleylamine citrate:

$$C_8H_{17}-CH=CH-C_8H_{16}-NH_2 \cdot HO-\underset{\underset{CH_2-COOH}{|}}{\overset{\overset{CH_2-COOH}{|}}{C}}-COOH$$

Tri-n-amylamine citrate:

$$(CH_3-CH_2-CH_2-CH_2-CH_2)_3N \cdot HO-\underset{\underset{CH_2-COOH}{|}}{\overset{\overset{CH_2-COOH}{|}}{C}}-COOH$$

N,N-dimethyl-n-dodecylamine citrate:

$$C_{12}H_{25}N(CH_3)_2 \cdot HO-\underset{\underset{CH_2-COOH}{|}}{\overset{\overset{CH_2-COOH}{|}}{C}}-COOH$$

n-Dodecylamine tartrate:

$$C_{12}H_{25}NH_2 \cdot \begin{array}{c} H \\ HO-\overset{|}{C}-COOH \\ HO-\underset{|}{C}-COOH \\ H \end{array}$$

The expression "catalytically active metal reagent" as used in the specification and claims refers to the metallic catalytically active metals as well as their catalytically active compounds.

We claim:

1. A motor fuel consisting essentially of gasoline, normally subject to deterioration caused by the action of molecular oxygen, containing a catalytically active metal reagent normally effective to catalyze oxidation of said gasoline, and having intimately admixed therewith a metal deactivator which is an amine salt of a hydroxy aliphatic carboxylic acid having the formula:

$$R-\underset{\underset{R_2}{|}}{\overset{\overset{R_1}{|}}{N}} \cdot X$$

wherein R represents a member selected from the group consisting of an alkyl group, an alkenyl group, a cyclobutyl group, a cyclohexyl group, a phenyl group and a tolyl group, $R_1$ represents a member selected from the group consisting of a hydrogen atom, an alkyl group, a cyclobutyl group and a cyclohexyl group, $R_2$ represents a member selected from the group consisting of a hydrogen atom and an alkyl group and X represents a member selected from the group consisting of a hydroxy aliphatic tricarboxylic acid having 6 carbon atoms and a hydroxy aliphatic dicarboxylic acid having 3 to 4 carbon atoms in small proportion sufficient to deactivate said catalytically active metal reagent.

2. A motor fuel consisting essentially of gasoline, normally subject to deterioration caused by the action of molecular oxygen, containing a catalytically active metal reagent normally effective to catalyze oxidation of said gasoline, and having intimately admixed therewith from about 0.0001 to about 0.01 percent based on the weight of the gasoline of a metal deactivator which is an amine salt of a hydroxy aliphatic carboxylic acid having the formula:

$$R-\underset{\underset{R_2}{|}}{\overset{\overset{R_1}{|}}{N}} \cdot X$$

wherein R represents a member selected from the group consisting of an alkyl group, an alkenyl group, a cyclobutyl group, a cyclohexyl group, a phenyl group and a tolyl group, $R_1$ represents a member selected from the group consisting of a hydrogen atom, an alkyl group, a cyclobutyl group and a cyclohexyl group, $R_2$ represents a member selected from the group consisting of a hydrogen atom and an alkyl group and X represents a member selected from the group consisting of a hydroxy aliphatic tricarboxylic acid having 6 carbon atoms and a hydroxy aliphatic dicarboxylic acid having 3 to 4 carbon atoms.

3. A motor fuel consisting essentially of gasoline, normally subject to deterioration caused by the action of molecular oxygen, containing a catalytically active metal reagent normally effective to catalyze oxidation of said gasoline, and having intimately admixed therewith an amine salt metal deactivator having the formula:

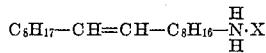

wherein X represents a member selected from the group consisting of a hydroxy aliphatic tricarboxylic acid having 6 carbon atoms and a hydroxy aliphatic dicarboxylic acid having 3 to 4 carbon atoms in small proportion sufficient to deactivate said catalytically active metal reagent.

4. A motor fuel consisting essentially of gasoline, normally subject to deterioration caused by the active of molecular oxygen, containing a catalytically active metal reagent normally effective to catalyze oxidation of said gasoline, and having intimately admixed therewith an amine salt metal deactivator having the formula:

$$(CH_3CH_2CH_2CH_2CH_2)_3N \cdot X$$

wherein X represents a member selected from the group consisting of a hydroxy aliphatic tricarboxylic acid having 6 carbon atoms and a hydroxy aliphatic dicarboxylic acid having 3 to 4 carbon atoms in small proportion sufficient to deactivate said catalytically active metal reagent.

5. A motor fuel consisting essentially of gasoline, normally subject to deterioration caused by the action of molecular oxygen, containing a catalytically active metal reagent normally effective to catalyze oxidation of said gasoline, and having intimately admixed therewith an amine salt metal deactivator having the formula:

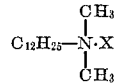

wherein X represents a member selected from the group consisting of a hydroxy aliphatic tricarboxylic acid having 6 carbon atoms and a hydroxy aliphatic dicarboxylic acid having 3 to 4 carbon atoms in small proportion sufficient to deactivate said catalytically active metal reagent.

6. A motor fuel consisting essentially of gasoline, normally subject to deterioration caused by the action of molecular oxygen, containing a catalyst of the group consisting of copper, cobalt, manganese, iron, lead, vanadium and chromium and their compounds, normally effective to catalyze oxidation of said gasoline, and having incorporated therein a metal deactivator in a small proportion sufficient to deactivate said catalyst, said metal deactivator being the tri-n-amylamine salt of citric acid.

7. A motor fuel consisting essentially of gasoline, normally subject to deterioration caused by the action of molecular oxygen, containing a catalyst of the group consisting of copper, cobalt, manganese, iron, lead, vanadium and chromium and their compounds, normally effective to catalyze oxidation of said gasoline, and having incorporated therein a metal deactivator in a small proportion sufficient to deactivate said catalyst, said metal deactivator being the oleylamine salt of citric acid.

8. A motor fuel consisting essentially of gasoline, normally subject to deterioration caused by the action of molecular oxygen, containing a catalyst of the group consisting of copper, cobalt, manganese, iron, lead, vanadium and chromium and their compounds, normally effective to catalyze oxidation of said gasoline, and having incorporated therein a metal deactivator in small proportion sufficient to deactivate said catalyst, said metal deactivator being the N,N-dimethyl-n-dodecylamine salt of citric acid.

9. A motor fuel consisting essentially of gasoline, normally subject to deterioration caused by the action of molecular oxygen, containing a catalyst of the group consisting of copper, cobalt, manganese, iron, lead, vanadium and chromium and their compounds, normally effective to catalyze oxidation of said gasoline, and having incorporated therein a metal deactivator in small proportion sufficient to deactivate said catalyst, said metal deactivator being the di-n-amylamine salt of citric acid.

10. A motor fuel consisting essentially of gasoline, normally subject to deterioration caused by the action of molecular oxygen, containing a catalyst of the group consisting of copper, cobalt, manganese, iron, lead, vanadium and chromium and their compounds, normally effective to catalyze oxidation of said gasoline, and having incorporated therein a metal deactivator in small proportion sufficient to deactivate said catalyst, said metal deactivator being the tri-n-butylamine salt of citric acid.

References Cited in the file of this patent
UNITED STATES PATENTS

| | | |
|---|---|---|
| 2,063,516 | Morrell | Dec. 8, 1936 |
| 2,086,867 | Hall | July 13, 1937 |
| 2,481,585 | Freeman | Sept. 13, 1949 |
| 2,584,784 | Biswell | Feb. 5, 1952 |
| 2,622,018 | White et al. | Dec. 16, 1952 |
| 2,633,425 | Thompson | Mar. 31, 1953 |
| 2,700,612 | Chenicek | Jan. 25, 1955 |
| 2,747,979 | Thompson | May 29, 1956 |